(12) United States Patent
Luck et al.

(10) Patent No.: US 9,753,850 B1
(45) Date of Patent: Sep. 5, 2017

(54) ON-HEAP HUGE SLAB ALLOCATOR

(71) Applicant: Hazelcast, Inc., Palo Alto, CA (US)

(72) Inventors: Greg Luck, Redwood City, CA (US); Christoph Engelbert, Remscheid (DE)

(73) Assignee: Hazelcast, Inc., Palo Alto, CA (US)

( * ) Notice: Subject to any disclaimer, the term of this patent is extended or adjusted under 35 U.S.C. 154(b) by 127 days.

(21) Appl. No.: 14/826,053

(22) Filed: Aug. 13, 2015

Related U.S. Application Data

(60) Provisional application No. 62/038,181, filed on Aug. 15, 2014.

(51) Int. Cl.
*G06F 12/02* (2006.01)
*G06F 9/455* (2006.01)

(52) U.S. Cl.
CPC ...... *G06F 12/0253* (2013.01); *G06F 12/0223* (2013.01); *G06F 12/0246* (2013.01); *G06F 2009/45583* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 7,290,110 B2* | 10/2007 | Loafman | ................ | G06F 12/023 707/999.202 |
| 2012/0222005 A1* | 8/2012 | Harris | ................. | G06F 9/45504 717/120 |
| 2012/0239871 A1* | 9/2012 | Badam | ................ | G06F 12/1425 711/104 |
| 2012/0317339 A1* | 12/2012 | Gissel | ................ | G06F 12/0871 711/103 |
| 2014/0082030 A1* | 3/2014 | Burka | ................ | G06F 12/0269 707/815 |
| 2015/0095695 A1* | 4/2015 | Mehra | ................... | G06F 3/0605 714/6.23 |

OTHER PUBLICATIONS

Azul Pauseless Garbage Collection © 2013, pp. 17.*
Jeff Bonwick, "The Slab Allocator: An Object-Caching Kernel Memory Allocator", USENIX Summer Technical Conference, pp. 12 (1994).*
Click et al. (The Pauseless GC Algorithm) 2005 ACM 1-59593-047-7, pp. 46-56.*

* cited by examiner

*Primary Examiner* — Kaushikkumar Patel
(74) *Attorney, Agent, or Firm* — Cooley LLP

(57) ABSTRACT

A non-volatile computer memory has instructions executed by a processor to create an array of pages, where each page is configured with individual chunks of memory to receive serialized data. The array of pages is positioned as an on-heap slab of at least 200 GB in a garbage collector managed area of a virtual machine memory.

6 Claims, 3 Drawing Sheets

ON-HEAP HUGE SLAB ALLOCATOR

CROSS-REFERENCE TO RELATED APPLICATION

This application claims priority to U.S. Provisional Patent Application Ser. No. 62/038,181, filed Aug. 15, 2014, the contents of which are incorporated herein.

FIELD OF THE INVENTION

This invention relates generally to memory management in computers. More particularly, this invention relates to an on-heap huge slab allocator.

BACKGROUND OF THE INVENTION

System level management of computer memory is referred to as memory management. Memory management provides ways to dynamically allocate portions of memory to programs and to reclaim memory no longer needed by programs. Memory requests are satisfied by allocating portions from a pool of memory called the heap or free store. The heap is normally associated with a program's memory space. Off-heap is an additional allocated memory area.

Virtual machines, like the Java® Virtual Machine (JVM), the .NET Common Language Runtime (CLR) or the Erlang Virtual Machine (BEAM), provide one or more options for automatic resource management and collection, referred to as Garbage Collection.

A common approach for Garbage Collection is storing all created objects based on their current lifetime in different areas, the so called Generational Garbage Collection. When objects mature they are moved from young generation areas, sometimes with intermediate regions, to an old generational space. The basic idea is based on the realization that most objects in today's applications have a very short lifetime.

When dead objects are about to be cleaned up, the Garbage Collector has to walk through all known and reachable (still living) objects and mark them. After the marking phase, those living objects are either evacuated to another space (for young and intermediate spaces) or all non-marked memory positions are wiped clean. Time to walk the objects grows exponentially by the number of reachable objects, it is therefore recommended to keep the number manageable. As a result, state of the art Garbage Collectors are generally limited to managing 4 GB of memory (with pauses of no longer than 100 milliseconds).

Moving objects involves costly memory area copying. Wiping out unused memory areas eventually results in fragmentation with small chunks of memory areas. The small chunks of memory are generally too small to store further objects unless multiple chunks are combined in a compaction operation. Compaction is time consuming and may result in the violation of latency guarantees.

Automatic resource management of this type is utilized when caching data in-memory. Caches keep cached elements with a fairly long lifetime; their count massively outnumbers the typical objects of an application. The Garbage Collector has to walk the objects on every collection cycle, which slows down the application.

Current workarounds are based on acquiring native memory from the operating system into the virtual machine's memory space and managing this region itself, without interaction from the Garbage Collector. This approach is often referred to as Off-Heap, in contrast to Garbage Collection managed On-Heap objects. Off-Heap processing allows for the management of huge memory spaces. As used herein, a huge memory space is from 200 GBs to 10s of TBs. Since Garbage Collection constraints are thought to limit On-Heap objects to no more than 4 GB, Off-Heap processing is deemed to be the only practical approach to managing huge memory spaces.

In the case of Off-Heap processing, cached elements are stored into a custom memory space and element references are removed from the heap. The Garbage Collector therefore does not know about this object anymore and does not visit it when searching for living objects. This requires objects with a known lifecycle behavior to be efficient. A drawback of this approach is that most virtual machines do not offer support for this directly. Rather, code has to call into native code and often convert internal data types into values that the operating system understands.

Therefore, there it would be desirable to avoid Off-Heap processing of huge memory spaces.

SUMMARY OF THE INVENTION

A non-volatile computer memory has instructions executed by a processor to create an array of pages, where each page is configured with individual chunks of memory to receive serialized data. The array of pages is positioned as an on-heap slab of 200 GB or more in a garbage collector managed area of a virtual machine memory.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
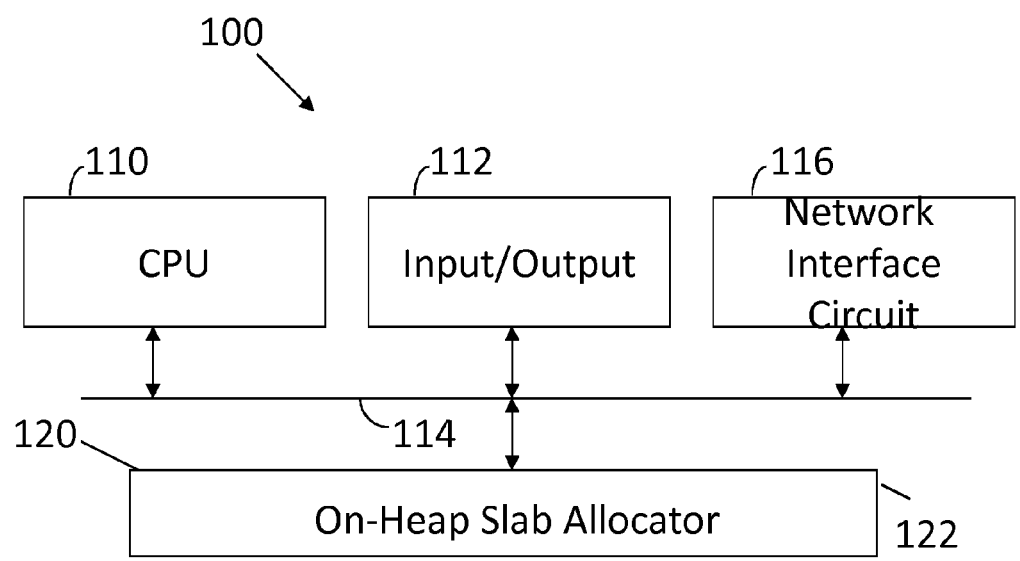
FIG. 1 illustrates a computer configured in accordance with an embodiment of the invention.

FIG. 1 illustrates a computer 100 configured in accordance with an embodiment of the invention. The computer 100 includes standard components, such as a central processing unit 110 and input/output devices 112 connected via a bus 114. The input/output devices 112 may include a keyboard, mouse, touch display and the like. A network interface circuit 116 is also connected to the bus to provide connectivity to a network.

A memory 120 is also connected to the bus 114. The memory 120 stores instructions executed by the central processing unit 110 to implement operations of the invention. In particular, the memory stores an on-heap slab allocator 122. The on-heap slab allocator creates an on-heap slab that avoids Garbage Collector problems and the problems associated with Off-Heap solutions.

An On-Heap slab allocator 122, which may be executed on startup of an application, creates a small number of very large arrays of a built-in data type (mostly of bytes) called Pages in the Garbage Collector managed heap area of the virtual machine. All pages together are defined as the Slab. Slab allocation is a memory management mechanism for the efficient memory allocation of kernel objects. It eliminates fragmentation caused by allocations and deallocations. The technique is used to retain allocated memory that contains a data object of a certain type for reuse upon subsequent allocations of objects of the same type.

An array is an object comprising continuous area of slots of the chosen data type. These arrays will eventually move to the old generational spaces and are the only visible objects to the Garbage Collector, minimizing Garbage Collection but maximizing usable storage.

Figure 2:
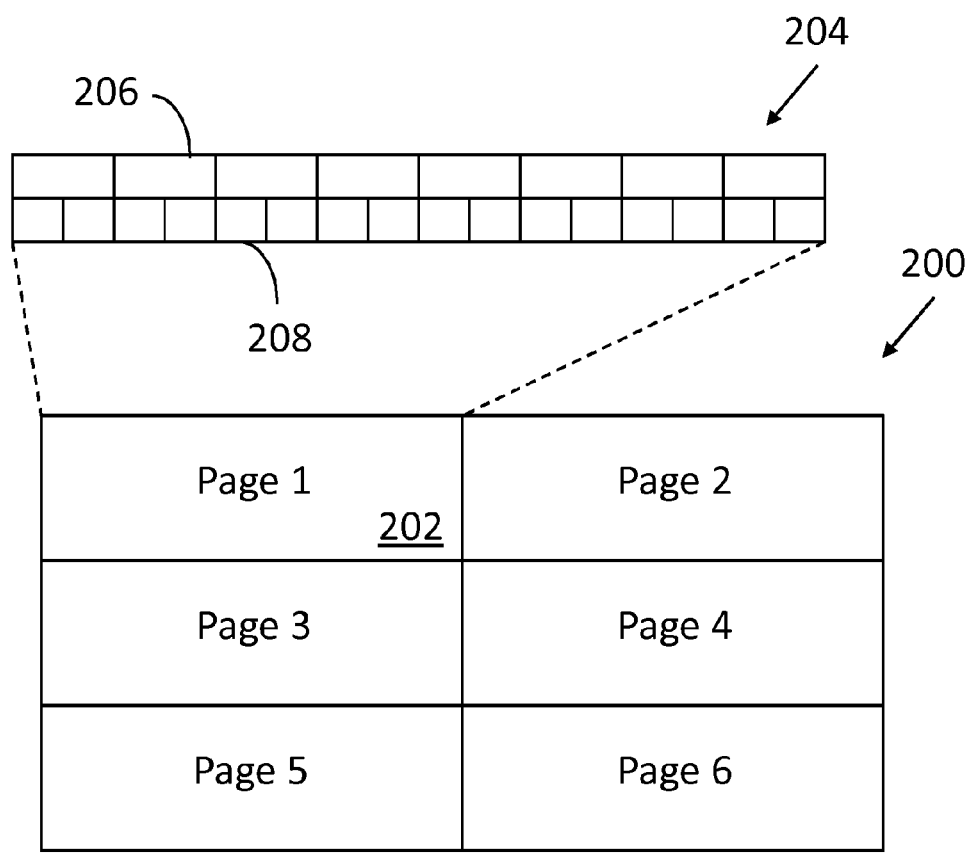
FIG. 2 illustrates pages and associated chunks utilized in accordance with an embodiment of the invention.

Pages are broken down into smaller units of storage capacity called chunks and are uniquely identified by an ID or name. FIG. 2 illustrates a collection or array of pages 200. Each page 202 has a set of chunks 204, potentially of different sizes 206 and 208. Chunk size is a power of two, but a page can have different chunk sizes (each of a power of two). However, it is not required to implement this buddy-allocator like behavior. Multiple chunks can be used in conjunction to store data exceeding the size of a single chunk.

Due to the fixed size of a chunk it might not be fully used if the storage volume (in case of multiple chunks, the remaining storage volume) is smaller than the size of a chunk. In this case the allocator will either try to find a smaller chunk or mark the leftover area as free.

If multiple chunks are required to store the data, those chunks must either be remembered in a collection of IDs (or names) or can have a special identifier at the beginning or end of the chunk identifying or referring to another chunk of data.

When storing an object, the object is transformed from its normal object state into a stream of bytes, a process commonly referred to as serialization. The stream of bytes is stored into the prior defined chunks. The storage mechanism is agnostic of the serialization algorithm. Thus, the On-Heap slab allocator 122 may utilize any number of serialization techniques.

After storing the object, a unique identifier for the object is returned to later retrieve the object. This unique identifier maps to the used page (array) and the position inside the page (chunk or remembered collection of chunks). Any number of mapping techniques may be used.

Figure 3:
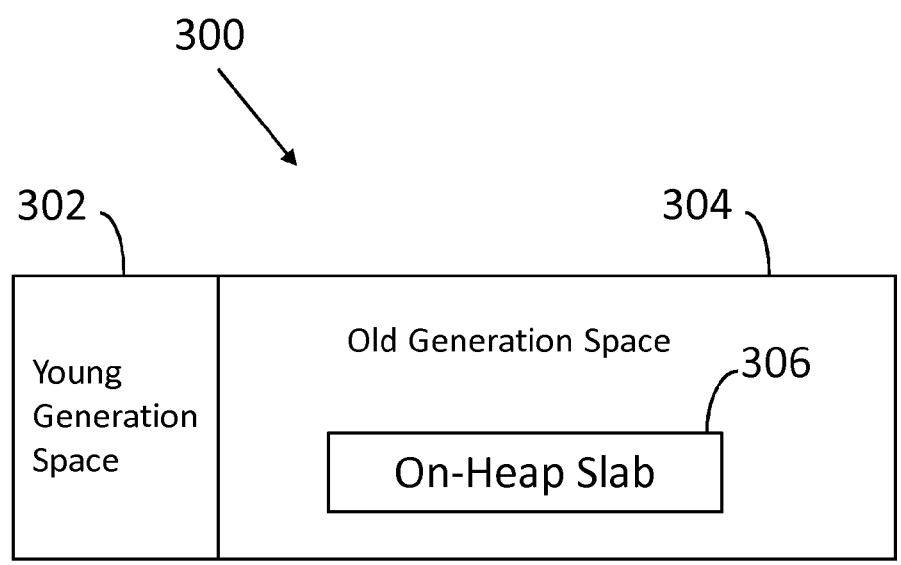
FIG. 3 illustrates a virtual machine memory with generational space sections and an on-heap slap in an old generation space.

Consider a heap of 256 gigabyte memory. For this example, the virtual machine has young generational space of 2 gigabyte and no intermediate generational spaces. This leaves 254 gigabyte for the old generational space. FIG. 3 illustrates a virtual machine memory space 300 with young generation space 302 and old generation space 304 (not shown to scale). The old generation space 304 hosts an On-Heap slab 306.

In this example, the On-Heap slab allocator 122 creates 250 pages, 1 gigabyte each, resulting in 250 gigabyte of usable space to the allocator. This operation is characterized by the following pseudo code.

```
class OnHeapSlabAllocator(nbOfPages) {
  pages:Page[ ]<=[0 . . . nbOfPages].foreach((idx)→new
     Page(idx, 1 GB))
}
```

In this case we create pages of byte arrays to store arbitrary data, internally, upon creation. The pages are broken down into a calculated number of smaller chunks. Created chunks might have different sizes to minimize the leftover free space inside chunks on small stored data.

Implementations are also free to implement combining and splitting of chunks at runtime to adapt to runtime behavior of the stored data. The following pseudo code creates pages of byte arrays.

```
class Page(pageIdx:Int32, size:Size) {
  content:Byte[ ]<=[0 . . . size].foreach(( )→new Byte( ))
  chunks:Chunk[ ]<=[0 . . . x].foreach((id)→new Chunk
     (pageIdx, id))
}
```

Chunks do not need to be stored as objects, but the following pseudo code is used to visualize the represented data.

```
class Chunk(pageIdx:Int32, id:Int32) {
  offset:Int32
  length:Int32
}
```

When objects are about to be stored, those objects are serialized and the resulting byte stream is allocated into pages and chunks. To generate the unique ID for the stored object, a 64 Bit long identifier may be calculated by using the 32 Bit index of the page and the 32 Bit offset inside the page content, which are comparable to the pointers in native applications. Any other way to create identifiers is also possible. The following pseudo code demonstrates object storage.

```
class OnHeapSlabAllocator(nbOfPages) {
  . . .
  currentPage:Int32<=0
  put(bytes:Byte[ ]):Int64 {
    size:Int32<=size(bytes)
    while not (pages[currentPage]→free(size)) {
      incOrZero(currentPage)
    }
    pages[currentPage]→put(bytes, size)
  }
}
class Page(size:Size) {
  . . .
  put(bytes:Byte[ ], size:Int32):Int64 {
    chunk <=freeChunk(remain)
    content[chunk.offset]<=copy(size, 0, 4)
    content[chunk.offset+4]<=copy(bytes[offset], 0, chunk.length)
    (pageIdx <<32)|chunk.offset
  }
}
```

To retrieve a stored element, the uniquely generated 64 Bit long identifier is used. By passing this identifier to a retrieval method it will, in this example, break down the 64 Bits into the original two 32 Bit values (pageIdx and offset) and retrieve the byte stream to be deserialized.

```
class OnHeapSlabAllocator(nbOfPages) {
  . . .
  get(identifier:Int64):Byte[ ] {
    pageIdx:Int32<=(identifier >>32) & 0xFFFFFFFF
    pages[pageIdx]→get(identifier)
  }
}
class Page(size:Size) {
  . . .
  get(identifier:Int64):Byte[ ] {
    offset:Int32<=identifier & 0xFFFFFFFF
    size:Int32<=copy(content, offset, 4)
    copy(content, offset+4, size)
  }
}
```

Those skilled in the art will appreciate that slab allocation of a huge memory space is a prior art Off-Heap technique. It was assumed in the art that given a large slab size (e.g., 250 GB) an off-heap implementation was necessary. It was also assumed that Garbage Collection On-Heap of a large memory space was impractical. However, since the Garbage Collector only sees individual manageable memory spaces (e.g., 1 GB), the invention achieves efficient Garbage Collector performance. In other words, utilizing the techniques of the present invention, the Garbage Collector does not observe potentially millions of objects stored in a 1 GB memory space or page and therefore its performance is not degraded in the manner that it would be if it had to observe those objects. It was assumed in the prior art that the Garbage Collector would need to manage all such objects and therefore On-Heap slab allocation of a large memory space was never deemed plausible.

While those skilled in the art generally try to avoid serialization operations, the use of serialization in connection with the On-Heat slab allocator allows a scaling of memory and therefore provides an acceptable option in this context.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-volatile computer memory with instructions executed by a processor to:
    create an array of pages, wherein each page is configured with individual chunks of memory to receive serialized data; and
    position the array of pages as an on-heap slab of at least 200 GB in a garbage collector managed area of a virtual machine memory, wherein the garbage collector managed area of the virtual machine memory includes 2 GB of young generational space and 254 GB of old generational space hosting the on-heap slab.

2. The non-volatile computer memory of claim 1 wherein the garbage collector processes individual pages of the array of pages.

3. The non-volatile computer memory of claim 1 wherein the individual chunks of memory are uniquely identified.

4. The non-volatile computer memory of claim 1 wherein the individual chunks of memory include individual chunks of memory of different sizes.

5. The non-volatile computer memory of claim 1 wherein the individual chunks of memory are each defined with a size that is a power of two.

6. The non-volatile computer memory of claim 1 wherein the individual chunks of memory are combined and split at runtime to adapt to runtime behavior.

* * * * *